No. 668,073. Patented Feb. 12, 1901.
W. O. WORTH.
MOTOR VEHICLE.
(Application filed Aug. 14, 1899.)
(No Model.) 5 Sheets—Sheet 1.

Witnesses. Inventor
William O. Worth
By Foree Bain
His Attorney.

No. 668,073. Patented Feb. 12, 1901.
W. O. WORTH.
MOTOR VEHICLE.
(Application filed Aug. 14, 1899.)
(No Model.) 5 Sheets—Sheet 3.

Witnesses.
S. H. Brainard,
E. J. Wilson

Inventor.
William O. Worth
By Forée Bain
His Attorney.

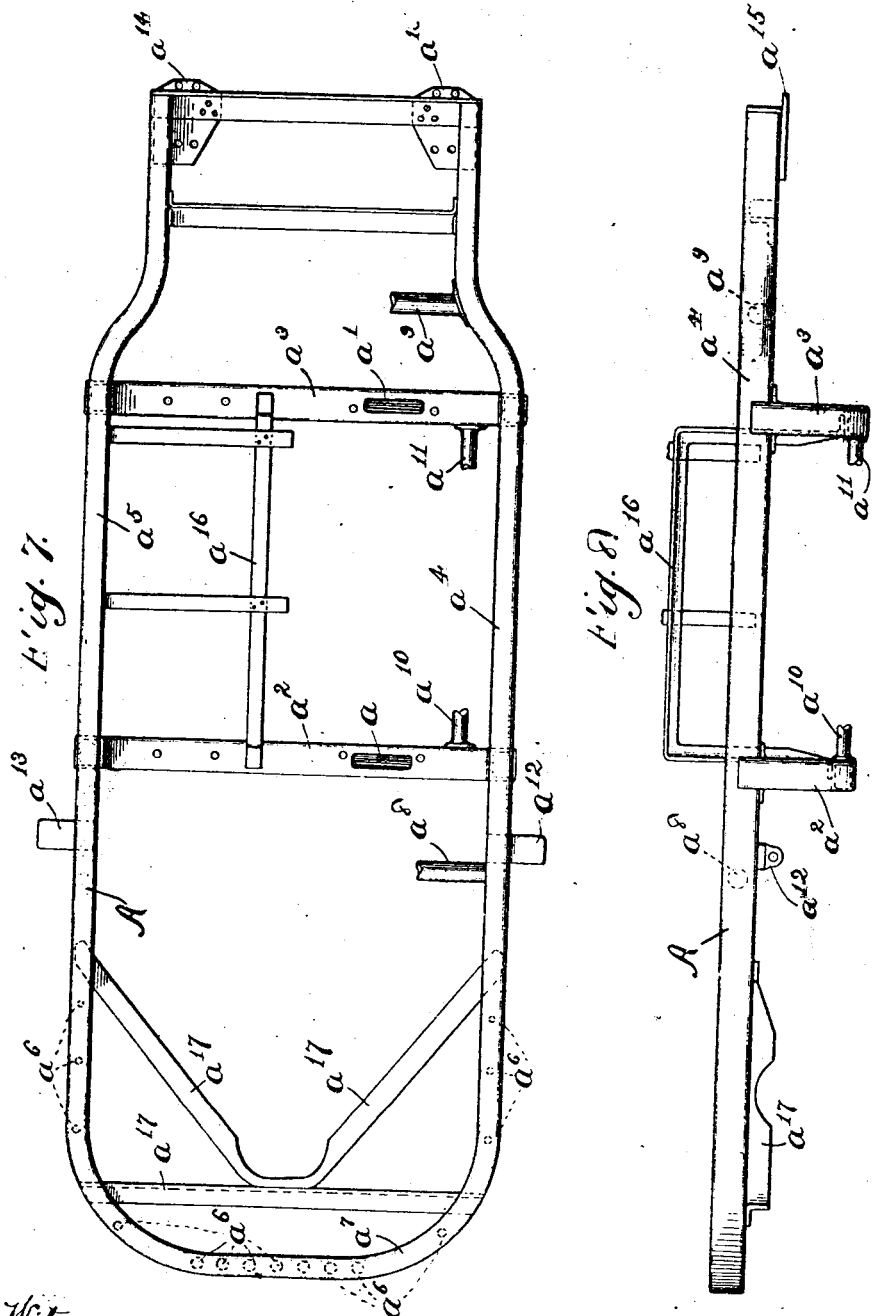

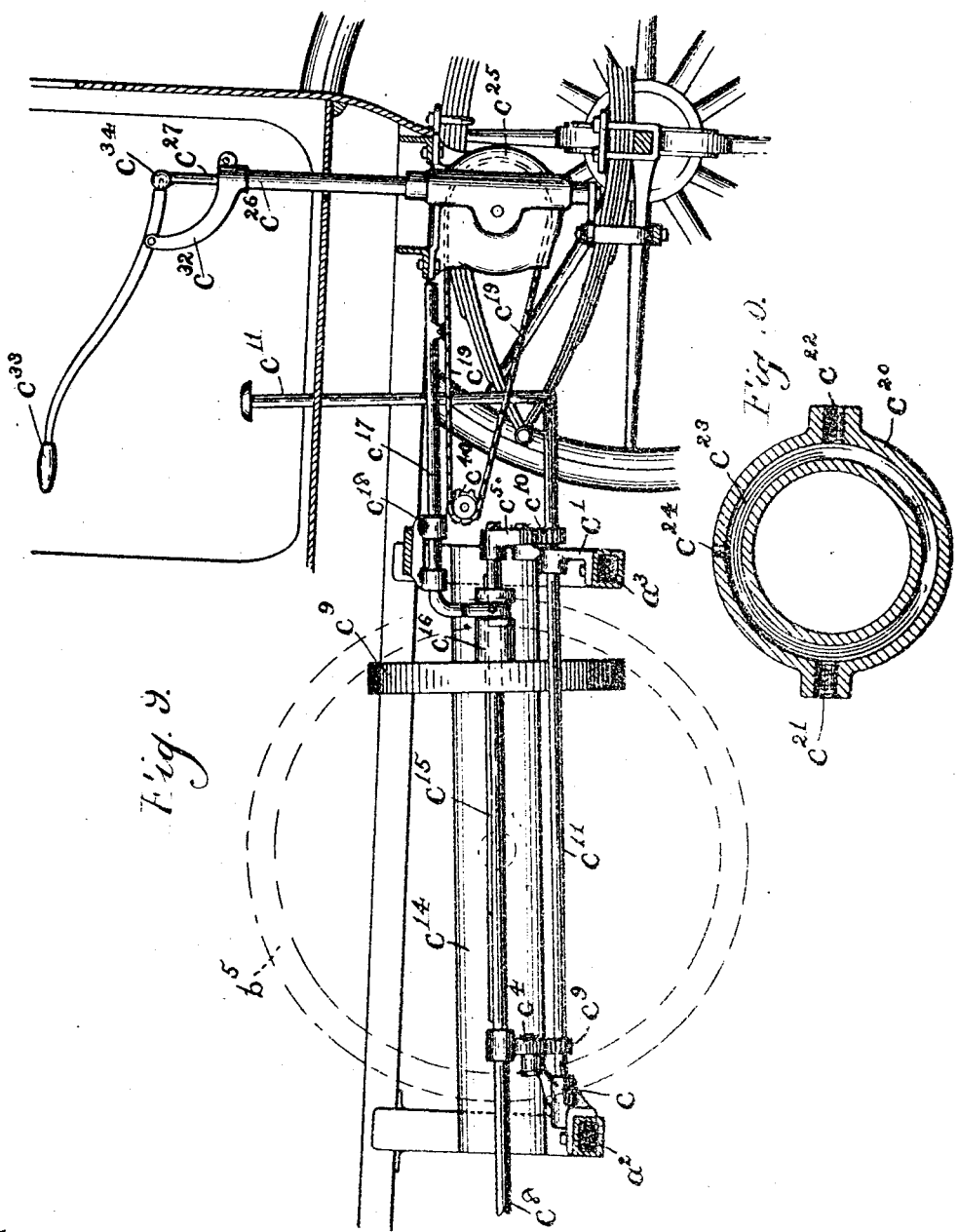

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLE CREEK, MICHIGAN.

MOTOR-VEHICLE.

SPECIFICATION forming part of Letters Patent No. 668,073, dated February 12, 1901.

Application filed August 14, 1899. Serial No. 727,169. (No model.)

*To all whom it may concern:*

Be it known that I, WILLIAM O. WORTH, a citizen of the United States, residing in Chicago, county of Cook, and State of Illinois, have invented certain new and useful Improvements in Motor-Vehicles; and I do hereby declare the following to be a full, clear, and exact description, such as will enable persons who are skilled in the art to which it appertains to make and use the same.

My invention relates to improvements in motor-vehicles.

One of the especial objects of my invention is to provide a more durable, practical, and satisfactory method of mounting the propelling mechanism upon the running-gear of the said vehicle, the construction being such that the propelling mechanism is self-contained and supported in a suitable frame upon the springs, so as to be relieved of the abrupt concussion and jars incident to such vehicles when traveling over rough roads, one of the effects of this construction being to prolong the operative life of such machinery.

I have noticed that when all of the weight of a carriage is carried upon the springs and the springs are proportioned for such a load the sensation of the passenger is that of pleasure and comfort, similar in effect to that experienced when riding in heavy railway-cars, such as parlor or sleeping coaches. I mount all of my mechanism upon a frame and support the frame upon the springs of the vehicle. I then construct the body of the vehicle independent of the running-gear or mechanism of the carriage and support that upon the frame carrying the motive mechanism.

My invention further consists in the novel constructions and combinations, as hereinafter more fully pointed out and specifically claimed.

Figure 1:
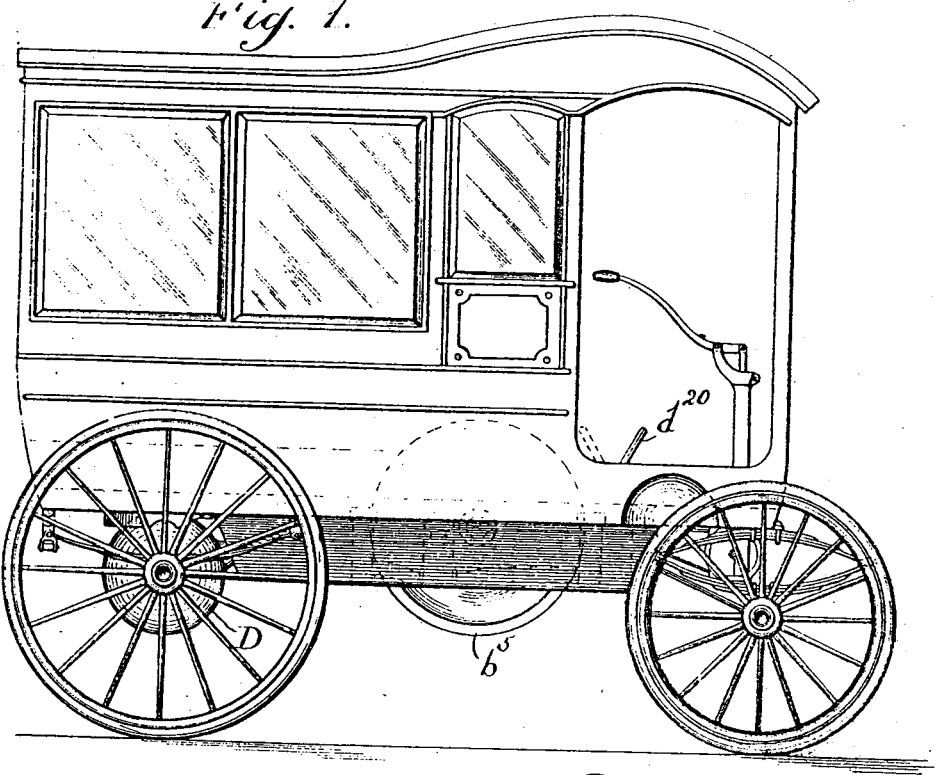
Figure 2:
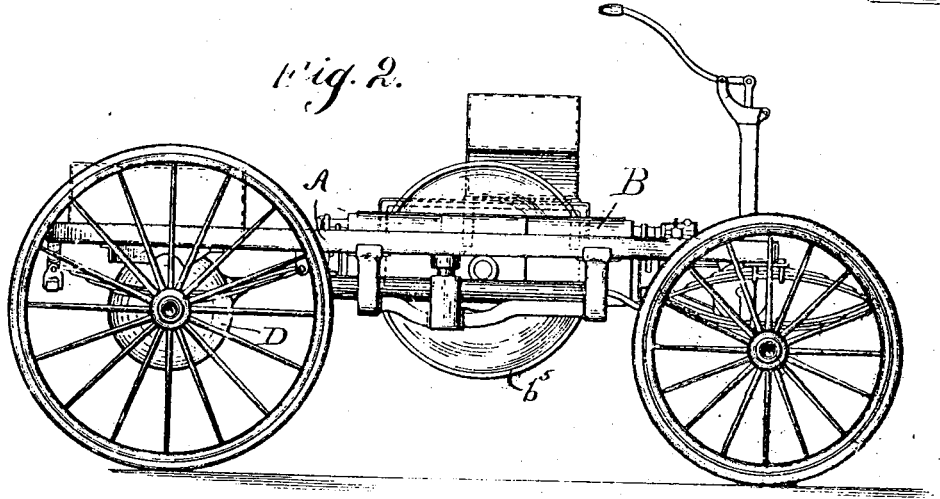
Figure 3:
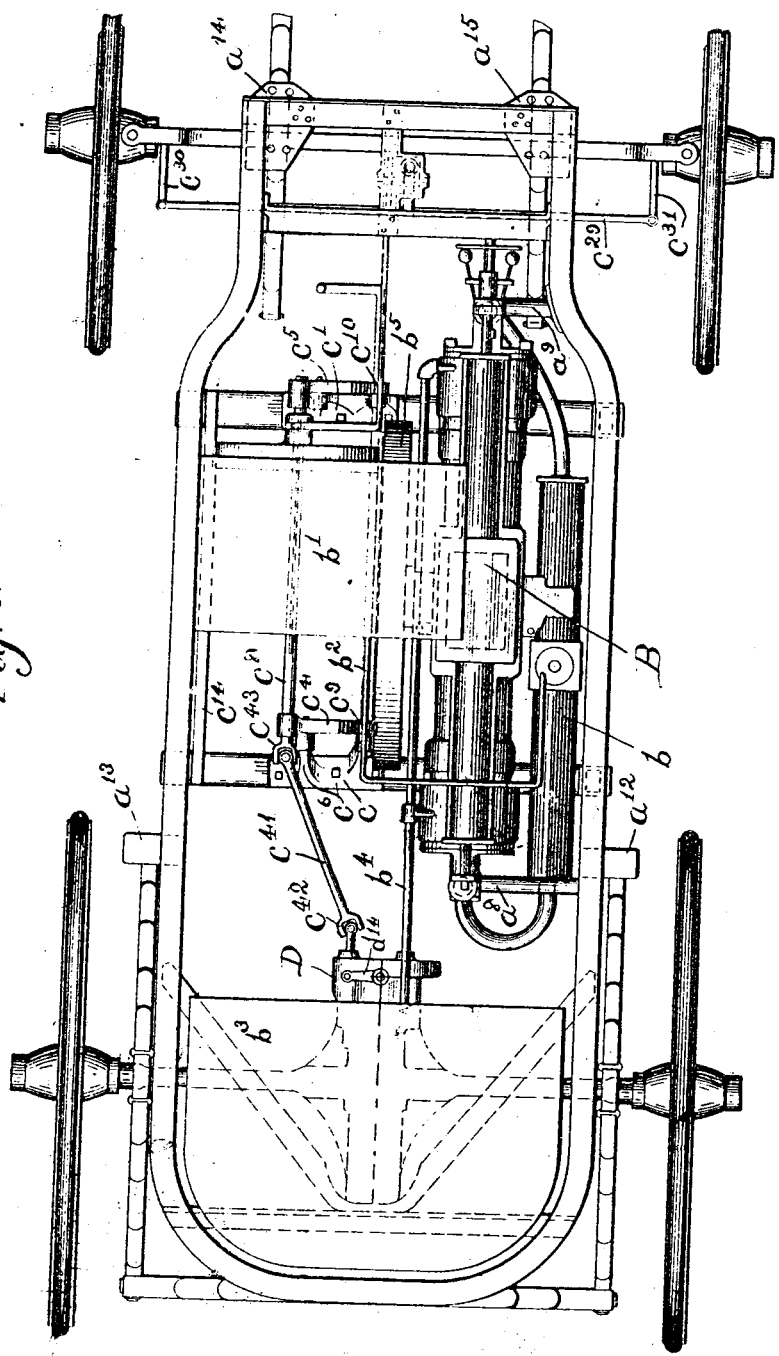
Figure 4:
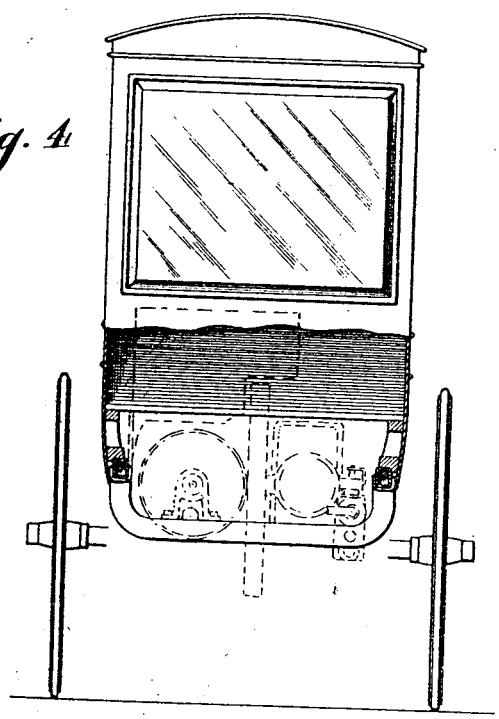
Figure 5:
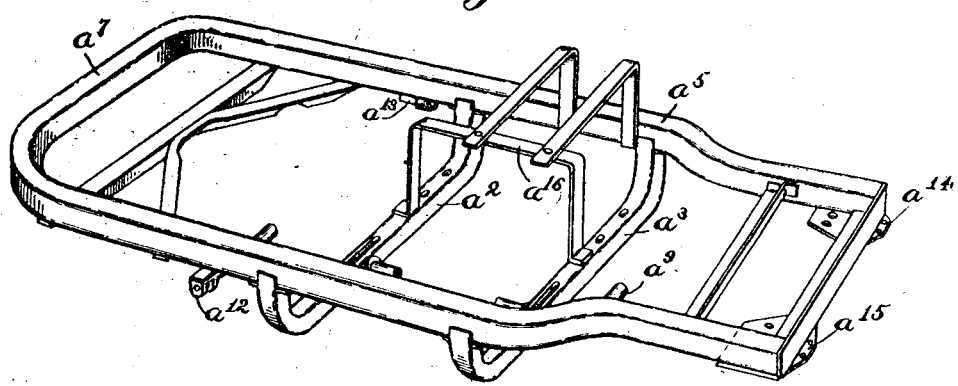
Figure 6:

In the accompanying drawings, Figure 1 is a side elevation of my motor-vehicle as it appears ready for operation. Fig. 2 is a side elevation of the running-gear, showing the propelling mechanism mounted thereon, the body of the vehicle being removed. Fig. 3 is a plan view of the propelling mechanism and running-gear with the body removed. Fig. 4 is an end elevation showing a rear view, partly in section, with the propelling mechanism in dotted lines. Fig. 5 is a perspective view of the frame upon which the propelling mechanism is mounted looking from a point above and in front. Fig. 6 is a broken-away detail view of a portion of the frame, showing holes that are contained in the rear lower side of the frame. Fig. 7 is a plan view of the frame. Fig. 8 is a side elevation of the same. Fig. 9 is a broken-away elevation showing the power-controlling mechanism. Fig. 10 is a detail section of a collar, showing lubrication-containing receptacle.

The same letters of reference in all of the views indicate corresponding parts.

Referring to Figs. 5, 6, 7, and 8, a frame A is shown, upon which the prime mover B—in this case a gasolene-engine—and all of the motive-power transmitting and controlling mechanisms are mounted. The frame is preferably made hollow, as shown in Fig. 6. The engine B is supported on the frame over the orifices $a$ $a'$, that are shown made into the interior of the hollow structure in the top surface of cross-bars $a^2$ $a^3$. The interior of the cross-bars $a^2$ $a^3$ communicates with the interior of the longitudinal portions of the structure $a^4$ $a^5$. The purging draft of air after passing through the engine is expelled through the orifices $a$ $a'$ into the interior of the hollow frame A, from which it emerges through the holes $a^6$, Fig. 6, that are drilled into the lower surface of the rear cross portion $a^7$. These holes gradually increase in size as the distance from the exhaust increases for the purpose of silencing the effect of the exhaust. Pipes $a^8$ and $a^9$ connect the exhaust-ports of the engine with the interior of the frame A, and pipes $a^{10}$ $a^{11}$ provide a passage through which a portion of the hot products of combustion from the frame A may be directed into a suitable receptacle of the carbureter for promoting the evolution of gas from the liquid fuel used therein. Clips $a^{12}$, $a^{13}$, $a^{14}$, and $a^{15}$ are the means employed by which the frame A is attached to the springs of the vehicle. An angle-iron frame $a^{16}$ supports a receptacle for containing the liquid fuel used by the engine. A similar brace-frame $a^{17}$ is adapted to support a receptacle for containing water to be used for cooling the cylinders of the engine B.

The engine B, as before stated, is supported on the cross-pieces $a^2$ $a^3$ over the ports $a$ $a'$. It is bolted firmly to the said cross-pieces through the holes shown on either side of the said ports in Fig. 7. The office of the said ports will be more thoroughly understood by referring to my application for Letters Patent for improvements in explosive-engines, filed June 19, 1899, Serial No. 721,078, wherein exhaust-ports for the exit of the purging charge of air are shown to pass through the interior of the brackets, upon which the engine is directly supported.

The driving and steering mechanism shown and described herein form subject-matter for an application to be hereafter filed, as required by a division of this case.

The engine B is not to be specifically claimed in this application. Therefore a general description with reference to its utility in this particular case only will be given. The engine is more minutely described and particularly claimed in the before-mentioned application.

The carburetor $b$, by means of which gas is evolved from liquid fuel—such as gasolene, kerosene, or the like—is connected to the tank $b'$, containing such fuel, by pipe $b^2$. The water-jackets of the engine B are connected to the water-tank $b^3$ by pipe $b^4$. The exhaust-ports of the engine are connected to the interior of the frame by pipes $a^8$ and $a^9$.

The engine expels its waste gases and air into the interior of the frame A. These gases have an exit from the interior of the frame through holes or perforations $a^6$, that are preferably drilled into the rear part of the frame from the bottom. By exhausting into the frame and allowing the injected gases to escape through several small holes in the manner described a very efficient muffler is provided, so that the noise due to the exhaust of the engine is almost entirely suppressed.

I have plainly described my motor-vehicle; but I do not wish to be held strictly to the construction shown, as a considerable latitude of variation may be made in the different parts without departing from the spirit and scope of my invention.

Having described my invention, what I claim as new, and desire to secure by Letters Patent of the United States, is—

1. In a motor-vehicle a frame partly, or wholly, composed of a tubular structure, apertures in the said structures, an engine mounted upon said frame, and a connection or passage-way directly joining the interior of the cylinder of the engine with the interior of said frame through the said apertures, substantially as set forth.

2. In a motor-vehicle a frame partly, or wholly composed of a tubular structure, an engine mounted on said frame, a carbureter for the said engine, and a connection or passage-way from the interior of said frame into or around the said carbureter, substantially as set forth.

3. In a motor-vehicle a frame partly, or wholly, composed of a tubular structure, an engine mounted on the said frame, exhaust-outlets in said engine directly connected to the interior of said frame through an aperture therein, and another aperture in said frame open to the atmosphere, substantially as set forth.

4. In a motor-vehicle a frame partly or wholly composed of a tubular structure, apertures in the said structure, an engine mounted on and communicating with the interior of the said structure, and a carbureter for said engine communicating with the interior of said structure, substantially as set forth.

5. In a motor-vehicle a frame partly or wholly composed of a tubular structure, an engine mounted on the said frame, apertures in the said structure into which the exhaust-outlets of the engine are connected, and a series of other apertures in said structure for the exit of spent gases, substantially as set forth.

WILLIAM O. WORTH.

Witnesses:
HARRY R. L. WHITE,
M. F. ALLEN.